United States Patent [19]
Cairns

[11] Patent Number: 4,636,590
[45] Date of Patent: Jan. 13, 1987

[54] METHOD AND APPARATUS FOR CONVERTING FREQUENCY SIGNALS REPRESENTING CHARACTERS TO BINARY CODE

[75] Inventor: John P. Cairns, Wilmington, Del.

[73] Assignee: Computer Security Corporation, Wilmington, Del.

[21] Appl. No.: 688,014

[22] Filed: Dec. 31, 1984

[51] Int. Cl.[4] .............................................. H04M 1/26
[52] U.S. Cl. .............................. 379/386; 340/825.73; 340/347 AD; 379/97
[58] Field of Search ............... 179/84 VF, 2 A, 2 DP; 340/870.26, 825.71, 825.73, 825.74, 347 AD

[56] References Cited

U.S. PATENT DOCUMENTS

| | | | |
|---|---|---|---|
| 3,686,440 | 8/1972 | Kroeger | 179/5.5 |
| 3,701,857 | 11/1972 | Usuda et al. | 179/84 |
| 3,870,821 | 3/1975 | Steury | 179/2 |
| 4,021,620 | 5/1977 | Jones et al. | 179/84 |
| 4,084,295 | 4/1978 | Goto et al. | 179/84 |
| 4,135,150 | 1/1979 | Quigley | 340/167 |
| 4,313,038 | 1/1982 | Nilssen et al. | 179/84 |
| 4,440,977 | 4/1984 | Pao et al. | 179/2 DP |
| 4,469,915 | 9/1984 | Lax | 192/2 A |

Primary Examiner—James L. Dwyer
Attorney, Agent, or Firm—Connolly & Hutz

[57] ABSTRACT

A frequency analyzing circuit for converting multifrequencies representing characters into selected signals for writing data into a plurality of channels adapted to effect enabling and disabling signals to a counter having an output code in binary form. Each of the channels is connected to a corresponding selected signal output of the frequency analyzing circuit from which the channel records a signal corresponding to a selected character.

A plurality of gates is provided in each channel. The selected data signal read by a channel produces a logic in the gates which activate an enabling output voltage from the channel circuitry which is responsive to the enabling voltage to generate the selected character in binary code and to latch when the binary code character is generated. The enabling output voltage from the actuated channel also generates a sequential pulsing to said channels which when applied to activated channel produces a logic in the gates which deactivates the output voltage and results in the latching of the selected character in binary code.

1 Claim, 6 Drawing Figures

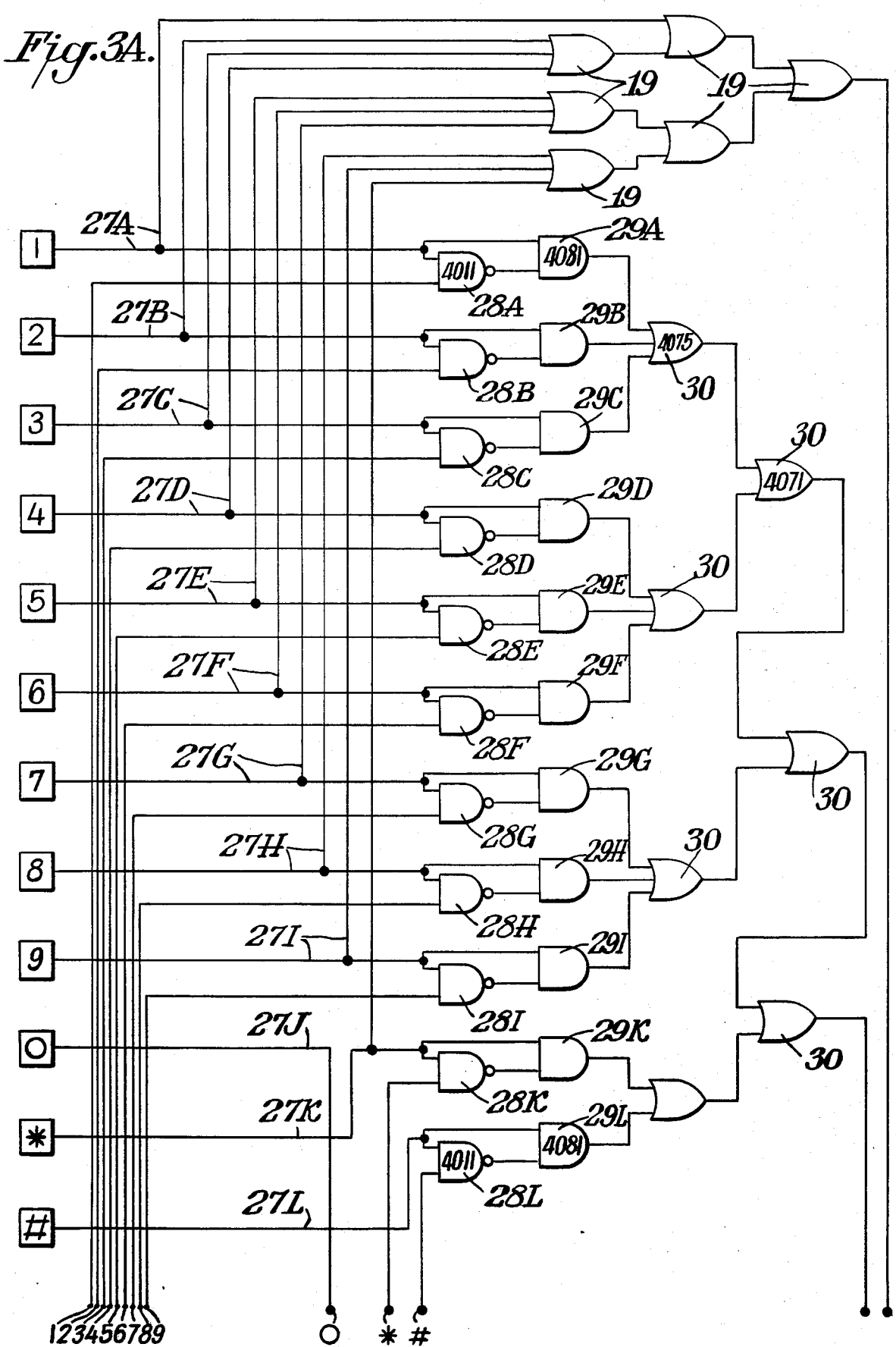

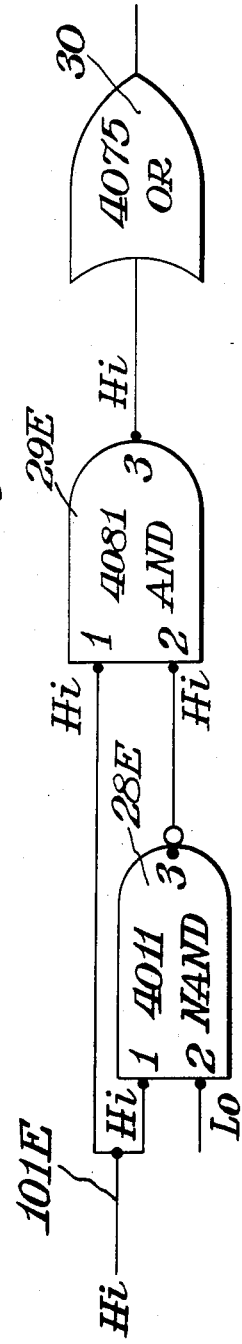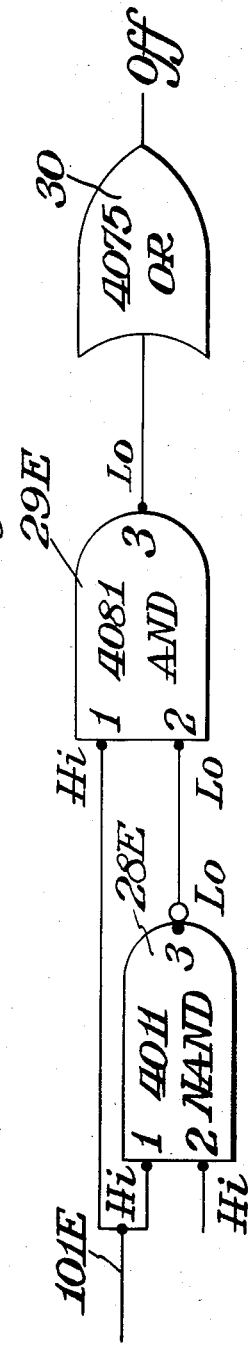

METHOD AND APPARATUS FOR CONVERTING FREQUENCY SIGNALS REPRESENTING CHARACTERS TO BINARY CODE

INVENTION

This invention relates to an apparatus and method for converting signals in frequencies representing characters to binary coded characters and more particularly to apparatus and method for the conversion of a frequency selection of audio tones representing characters to the binary coded characters.

BACKGROUND OF THE INVENTION

Audio tone signals employing multiple frequencies are provided to make selections for controlling circuits. The circuits providing these audio tone signals produce different audible frequencies which are paired in a variety of combinations to produce distinctive output pulses. The output pulses are transmittable to effect control of a system.

These discrete output pulses may control a system which provides character selection correlated to the distinctive output pulse. For example, the output pulses may be correlated to decimals 0-9.

SUMMARY OF THE INVENTION

The apparatus of the present invention comprises a tone decoder of frequency analyzing switches connected to control gate circuitry, which is preferably comprised of NAND gates, AND gates and OR gates. The frequency analyzing switches write data into the control gate circuitry. The control gate circuitry controls a timing means and counters, including a synchronous counter for providing an output in binary coded characters. A suitable timing means is an electronic clock. The data from the decoder switches is converted to binary coded characters.

The tone decoder switches are connected to control gate circuitry with an output terminal of the control gate circuitry being connected both to an enable pin of the clock and to a low-activated enable pin of a coincidence counter. The clock is connected so that pulses generated by the clock are applied both to a clock input pin of the coincidence counter and to a clock input pin of the BCD counter.

With particular reference to the operation of the control gate circuitry decoding of the frequency signal results in the application of signals to appropriate gates in the control gate circuitry, which ultimately initiates counting of the clock pulses for both the coincidence counter and the BCD counter. In the coincidence counter this is a pulsing of a sequence of terminals, each terminal representing a character, and it continues until the coincidence counter has reached the character corresponding to the character represented by the tone decoded signal. As explained in the detailed explanation below, a high signal appearing at the output pin of the coincidence counter corresponding to the actuated character in the audio tones applies to the appropriate gate in the control gate circuitry, a high voltage in a manner to effectively turn off the control gate circuitry and accordingly both counters. The corresponding binary coded count in the BCD counter at the time of turn off is then available as a representation in binary code of the character actuated on the tone decoder.

In summary, the operation of the conversion procedure involves the actuation of the tone producing switches which decode the tones (each representing a character) to produce a predetermined output signal which output signal is transmitted to a designated channel in the control gate circuitry. The predetermined output signal applying a positive pulse to appropriate gating circuits in the control gate circuit result in coincident high signals at a gating circuit which turn on the gating circuit and which in turn enables the clock and causes the counters to commence operation.

The concidence counter is a decade counter which increments one count at a time applying pulses successively to the channels of the control gate circuitry. When the pulsing reaches the channel which initiated the counter and clock operation, the pulse from the coincidence counter to that channel causes coincident high states in the gating circuit which as a result turn off the gating circuit by changing the voltage and in doing so turn off the power to the clock and inhibit counters so as to stop the operation.

During the operation periods, the binary coded synchronous counter produces at its four terminals charge states which match the binary coded characters corresponding to the designated character of the initial tones. This occurs when the coincidence counter applies a pulse to the channel which initiated the operation and when this occurs the channel changes voltage state and the operation period is terminated, the synchronous counter latches on its terminals the corresponding binary coded character. Thus, when the system is started by the initiating and decoding of a audio frequency tone representing a given example, the clock and counters are actuated to reach and produce and latch tor future use the binary coded character corresponding to the character introduced by the frequency selection.

DESCRIPTION OF THE DRAWINGS

FIGS. 3A and 3B are schematic diagrams of circuitry for converting decoded audio frequency signals to binary coded characters.

FIGS. 4A and 4B are detail schematic diagrams of a select pair of gates in the circuitry shown in FIG. 3A.

DETAILED DESCRIPTION OF THE PREFERRED EMBODIMENT

Figure 1:
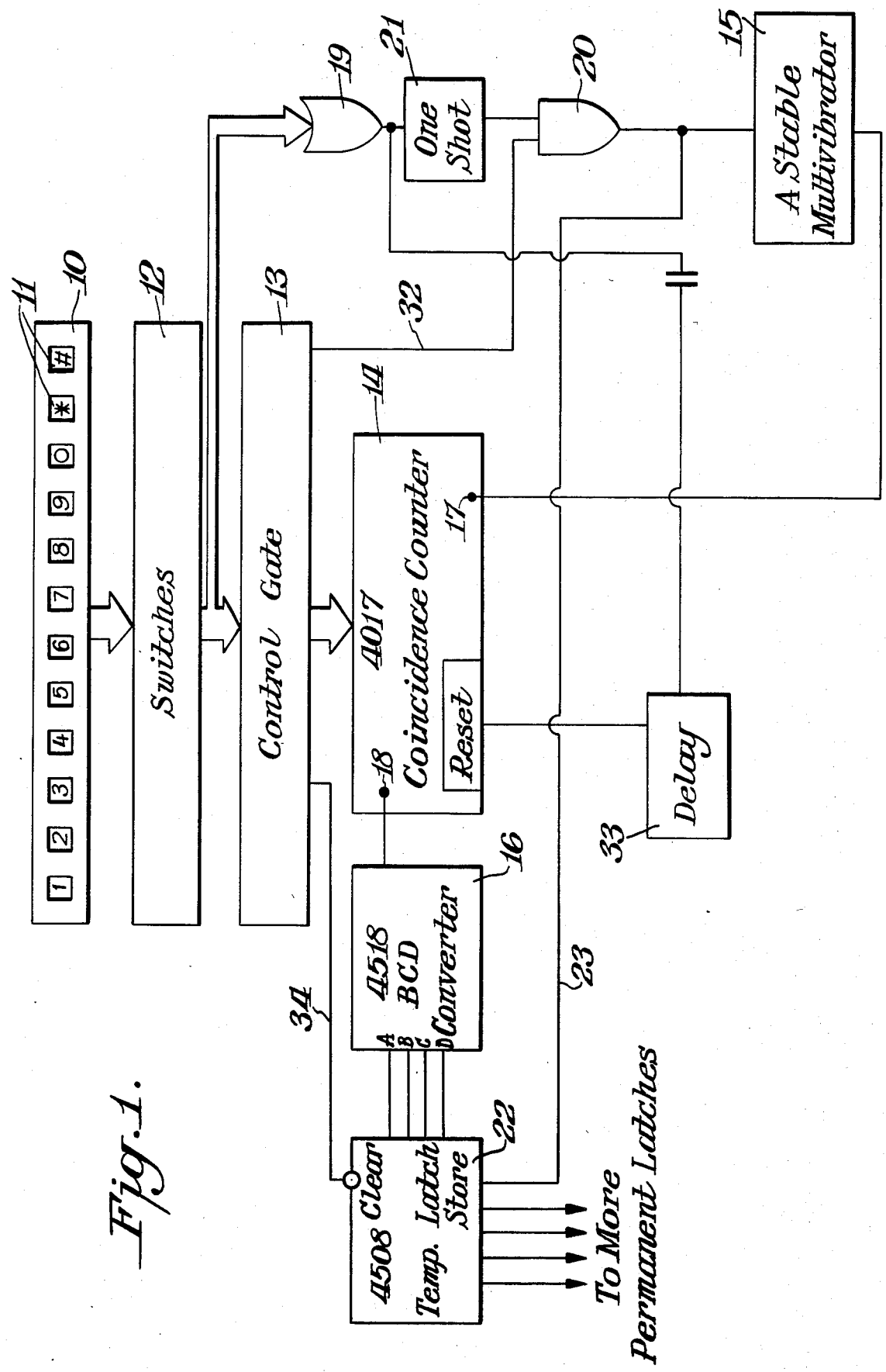
FIG. 1 is a block diagram of the apparatus embodying the present invention.

FIG. 1 shows a system for converting to binary code audio frequencies which represent predetermined characters. First the tones representing characters are decoded to data signals, then the data signals are converted to binary coded characters for further transmittal and processing. In FIG. 1, block 10 represents a mechanism for producing the audio frequencies in association with characters, such as alphanumeric characters. A preferred means is a standard Touch-Tone assembly actuated by buttons 11 representing the characters 0-9 and # and *.

In this embodiment of the present invention the actuation of each button 11 transmits audio tones. Pairs of tone bursts are produced in block 10 and are generated into character data signals in the multiple frequency analyzing circuit represented by block 10 and block 12 identified as switches block 12. These character data signals are transmitted to channels, as described below, in the control gate represented in FIG. 1 by block 13.

The characterized buttons of block 10 produce tone bursts having frequencies in H$_z$ as follows:

| Button Number | Low | High |
| --- | --- | --- |
| 1 | 697 | 1209 |
| 2 | 697 | 1336 |
| 3 | 697 | 1477 |
| 4 | 770 | 1209 |
| 5 | 770 | 1336 |
| 6 | 770 | 1477 |
| 7 | 852 | 1209 |
| 8 | 852 | 1336 |
| 9 | 852 | 1477 |
| 0 | 941 | 1336 |
| * | 941 | 1209 |
| # | 941 | 1477 |

Character herein is a letter, digit or other symbol that is used as part of the organization, control or representation of data.

Binary code and coding herein refers to expressing a character in a notation in which the characters is represented by a binary bits.

Reference may be had to devices of a frequency analyzing type disclosed in Engineers Notebook II, A Handbook of Integrated Circuit Applications by Forrest M Mims III (Radio Shack, 1982) and is hereby incorporated in the present disclosure.

Block 12 represents the switches which transmit the output pulses produced by the decoding of the audio frequencies each representing a character. In the present embodiment this is 12 different output pulses moving in the direction indicated by the arrows. The pulses are separately and individually received at control circuitry 13 through suitable circuitry described below and to result in a positive pulse which activates a coincidence counter 14 and a BCD counter 16 through an astable multivibrator 15.

The output of the multivibrator clock 15 connected to counter 14 at pin 17 puts that counter 14 in the run mode. The multivibrator clock 15 produces output square wave pulses. The output from multivibrator 15 results in clock pulses from this timing means at the input 17 of counter 14. These clock pulses synchronize timing of the count progression in the two counters 14 and 16. The clock pulses are applied both to the clock input pin 17 on the coincidence counter and to the clock input pin 18 of the binary coded counter 16.

The tone produced pulse from the bank of switches 12 produces a positive potential on an OR gate. The resultant positive output is combined in an AND GATE 20 with a positive output from the control gate circuitry 13 to provide the output to multivibrator 15 and the activation outlined above. The output from OR gate 19 is preferably processed through a one shot 21 which is a power-on for the multivibrator clock 15.

The binary coded information from counter 16 is transmitted to a latch 22 where it is temporarily stored. A line 23 from the output of AND gate 20 sets the latch mechanism of latch 22 in hold position so as to store the binary coded information until the cycle is complete at which time the information is relayed to permanent latches (not shown).

The circuits of block 10 produce a signal in accordance with an actuated button 11. A pulse is transmitted through the appropriate switch of block 12 to the control 13 which in turn turns on the two counters 14 and 16 through multivibrator 15 as described in greater detail below.

On the line 32 a loss of the pulse to the AND gate 20 from the control gate 13 is the result a coincidence of pulses in the control gate 13. The line 32 in losing its positive voltage to the AND gate 20 has the effect of turning off the multivibrator clock 15. This couples a negative pulse over to a delay circuit 33 which initiates a reset on both coincidence counter 14 and the converter 16.

When STORE pin in latch 22 goes negative the input and the output within latch 22 become disconnected because while a positive is applied to STORE pin a connection between the latch 22 input and output is held closed. The removal of the positive voltage at STORE pin causes this connection to open. The effect of the disconnection is to hold the last character on the latch output. It will be seen that the timing of the operation is such as to provide that this last character represented on the binary output is the character of the data signal which initiated the counter operation.

After the binary character is latched in the latch 22 the delay circuit 33 resets the counter 14. The delay circuit holds up the coincidence counter 14 pulsing for 4 milliseconds before the start of the count progression in counter 14. This may be termed debounce time or avoidance of mechanical feedback.

Figure 2:
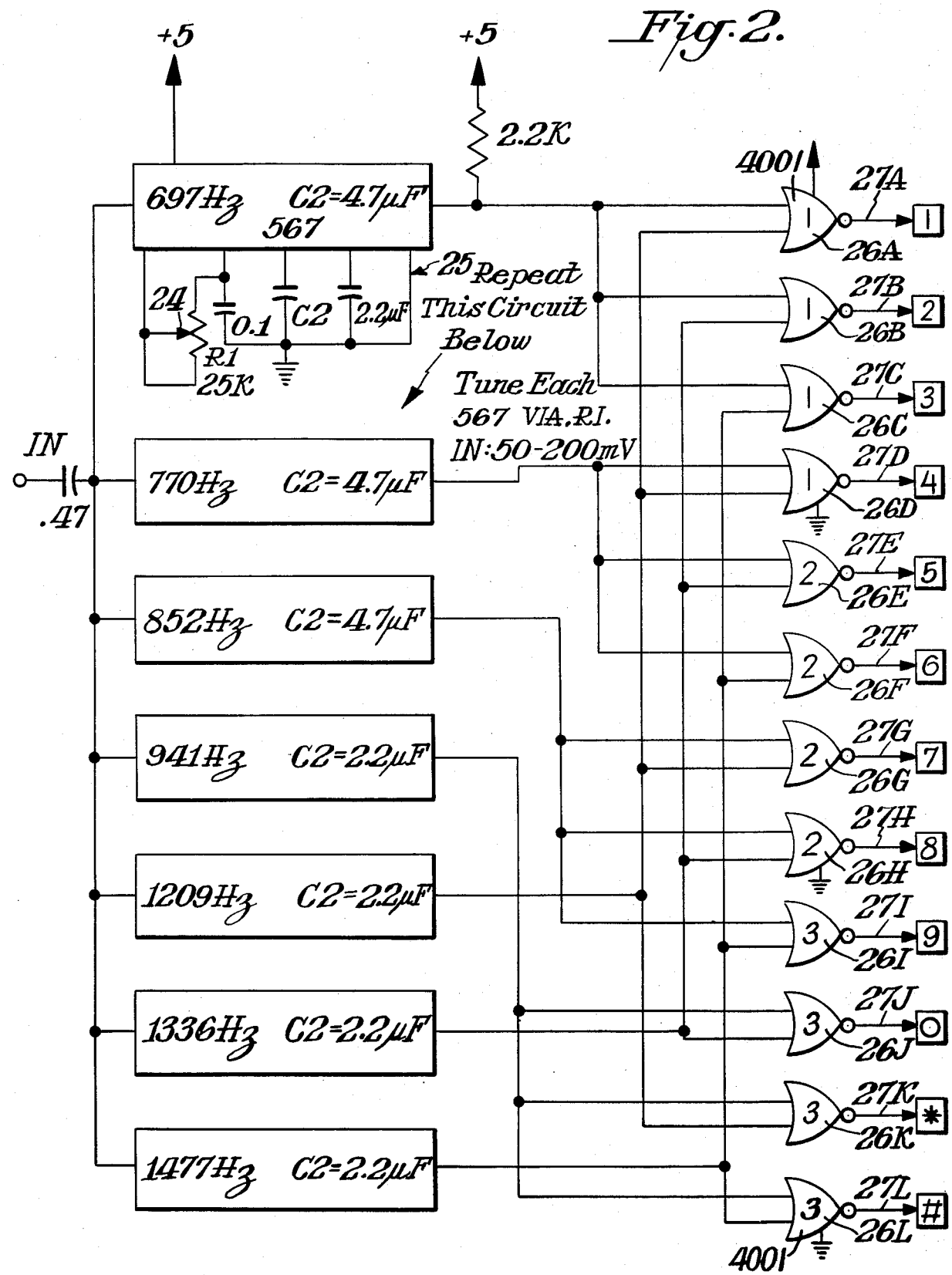
FIG. 2 is a schematic diagram of circuitry for decoding audio frequencies.

Actuation of the buttons 11 illustrated in FIG. 1 and not shown in FIG. 2 produces a distinctive combination of sound frequencies as referred in FIG. 2 by legends. A representative circuit is illustrated at the block representing the 697 Hz frequency.

This is a phase lock loop 25 in which adjustment by a potentiometer 24 to the center frequency of the RC loop 25 is used to detect the requisite frequency for the appropriate tone used in the frequency producing mechanism.

A similar loop (not shown) is embodied in each of the individual frequency detectors with appropriate tuning.

Referring further to FIG. 2, these frequencies are combinable to produce 12 different output pulses from NOR gates 26A to L for the characters 1-9, 0, * and #. These NOR gates 26A-L act as switches for passing positive pulses. The positive pulses are transmitted on output lines 27A-L to the control gate circuitry 13. As illustrated in FIG. 3, the circuitry 13 control is made up of NAND GATES, AND GATES, and OR GATES. A typical channel is illustrated by the schematic diagrams FIGS. 4A and 4B. At the start the counter 14 is set at the 0 and the counter 16 is set with terminals A, B, C and D set at 0 and the clock 15 is off.

Figure 3B:
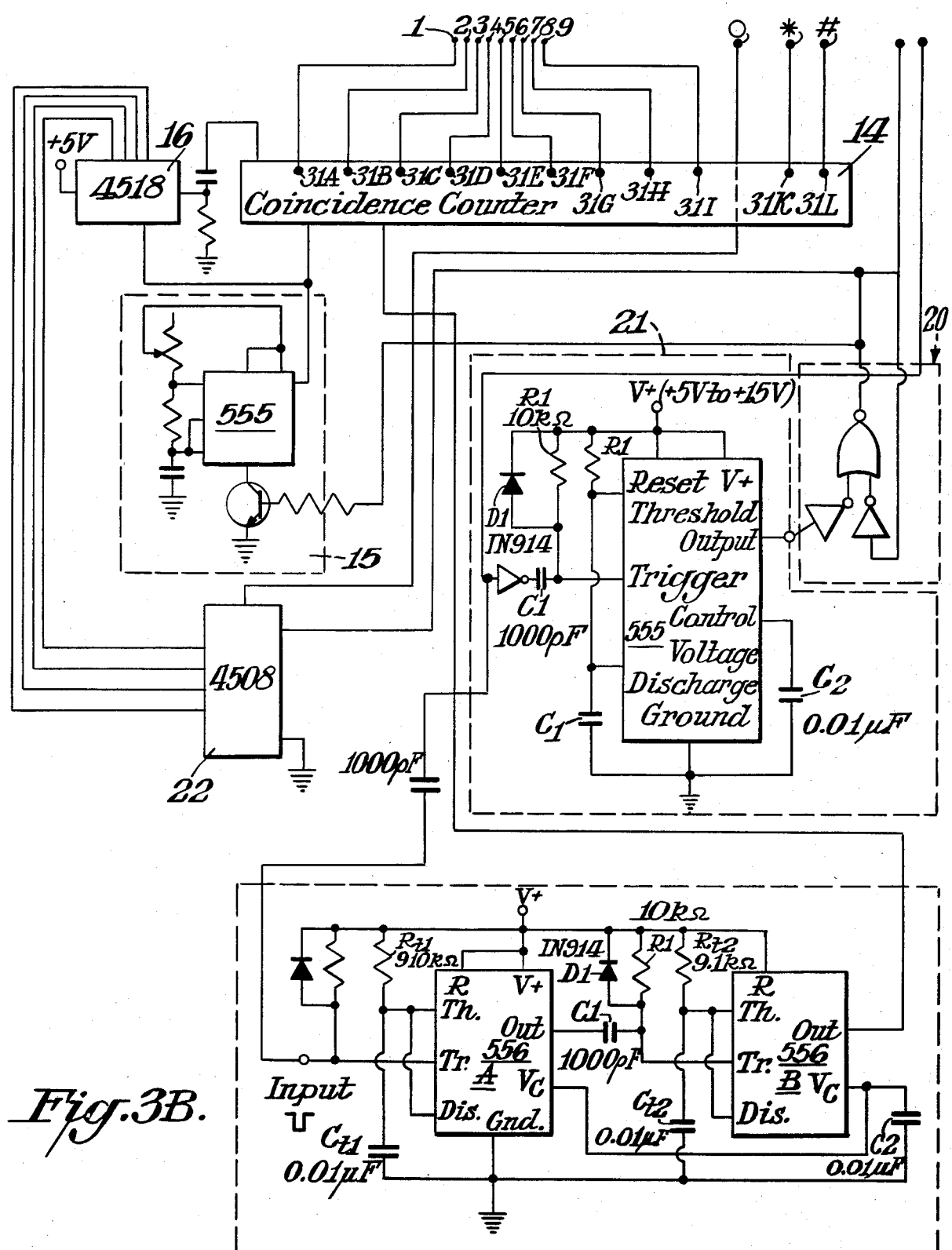

Referring to the schematic diagram of FIGS. 2, 3A and 3B decimal signal, for example the number 5 is transmitted from the OR gate 26E of the audio tone decoder to a channel in the control circuitry 13 over the line 27E to provide a positive pulse in the control 13.

Referring to FIG. 4A a detail is shown of part of the circuit for converting the number 5. Points 1 in 28(E) and 29(E) receive a high pulse. The NAND 28(E) having a positive or high only on pin 1 provides a reversal to provide a high voltage at pin 3. Thus, pins 1 and 2 of 29(E) receiving coincident high pulses and being high produce a high voltage at the output pin 3 of this AND gate 29(E) and through the OR gates 30, a pulse is sent out which starts the clock 15 and the two counters 14 and 16 to run.

Referring further to the schematic diagram of FIGS. 3A and 3B showing the counter 14 and 16. The timing of the pulses from clock 15 to counter 14 results in the scanning of positive pulses sequentially through the sequence of output pins 31A-I, K and L simultaneously with the production of binary characters on the terminals A, B, C and D of counter 16. The production of the BCD for five at these output terminals of counter 16 coincides in time with application of a positive pulse to the pin 31E of counter 14. Thus when the BCD 0101 appears in counter 16, pin 31E of counter 14 receives a positive pulse.

The positive voltage from OR gates 30 is removed by coincident positive pulses present on the NAND gate 28E. These coincident pulses are a positive pulse on line 27E and the positive pulse from pin 31E of counter voltage on the output to low. This in turn changes the two high inputs to the AND gate 29E to one high and one low resulting in a change in the output to low. The OR gates 30 of the control gate circuitry 13 relay this low to the clock 15 through the AND gate 20, which reverses it to apply a high voltage turning off counter 14 and clock 15 with the BCD of 5 at the terminals of counter 16. At this point in time the binary code is transmitted from the terminals A-D of counter 16 to be temporarily latched in the latch 22. The counter 14 and 16 are each reset at 0 and the system is in readiness to receive the next character for decoding by actuation of one of the buttons.

Note that in FIGS. 1, 3A and 3B the line 34 for the character 0 goes to CLEAR in the latch 22, and that is how the character 0 is entered through the CLEAR function of latch 22.

A feature of the present invention lies in the concept that in point of time as the counters are reset by the coincident stage which turns off the counting operation, there is the proper representation of the selected character in binary code latched available for further processing.

The component making up the system of this invention are particularly adaptable to microelectronic design and processing. While the invention may be incorporated in discrete device circuits, it is a feature that it may be packaged in physical microelectronic parts, such as monolithic chip.

The invention is described herein by means of specific embodiment, obvious modifications will occur without departing from the spirit of the invention. The terms and expressions are used as terms of description and not limitation. The arrangement of parts is illustrative of the principles of the invention and input data signals representing characters can be used from a variety of sources. Numerous other arrangements may be devised by those skilled in the art without departing from the spirit and scope of the invention.

I claim:

1. A system for converting selected characters to binary code data, comprising
   a plurality of means for producing signals of selected audio frequencies,
   a plurality of NOR gates,
   means connecting pairs of said frequency producing means to the NOR gates for transmitting to selected NOR gates pairs of frequency signals and producing a positive output signal from a NOR gate upon coincidence of a pair of frequency signals,
   wherein the output signals from the NOR gate represent selected code characters
   a plurality of channels consisting of a NAND gate, an AND gate and an OR gate connected in series, said channels representing code characters,
   means transmitting the output signal representing a code character from each NOR gate to the channel representing the code character to produce an activating pulse from the channel,
   a coincidence counter having output pins each output pin corresponding to a code character,
   means connecting the channels to the corresponding coded output pins of the coincidence counter,
   a clock means for providing clock pulses,
   means for transmitting the activating pulse to the clock means to activate the clock pulses
   means in said coincidence counter for applying positive pulses successively to the channels connected at the output pins,
   a coded counter for producing successively code characters at terminals of the coded counter,
   means for providing clock pulses synchronously to increment the coincidence counter and the coded counter to produce simultaneously a positive pulse at a coded output terminal of the coincidence counter and the corresponding code character in the output of the code counter, and remove from the channel which activates the clock the activating pulse to discontinue the incrementation and produce at the output terminals of the coded counter the code character represented by the activating channel.

* * * * *